March 2, 1971　　　S. R. SECCOMBE　　　3,566,475
PRECISION PLOTTER

Filed April 25, 1969　　　　　　　　　　5 Sheets-Sheet 1

INVENTOR
STEPHEN R. SECCOMBE
BY Jackson & Jones
ATTORNEYS.

March 2, 1971     S. R. SECCOMBE     3,566,475
PRECISION PLOTTER

Filed April 25, 1969     5 Sheets-Sheet 2

United States Patent Office 3,566,475
Patented Mar. 2, 1971

3,566,475
PRECISION PLOTTER
Stephen R. Seccombe, Northridge, Calif., assignor to Computer Industries, Inc., Sherman Oaks, Calif.
Filed Apr. 25, 1969, Ser. No. 819,325
Int. Cl. G01b 21/00
U.S. Cl. 33—1                     26 Claims

ABSTRACT OF THE DISCLOSURE

A precision plotter is disclosed having a movable arm extending over the plotting table, the arm is transversely driven along the X axis by a lead screw rotatably mounted along the one edge of the table. A pen carriage is slidably mounted on the movable arm and is driven by means of a drum and cable means. The drum is attached to the movable arm and is axially movable along a splined shaft to be rotatably driven thereby. The lead screw and splined shaft are rotatably driven by motor means located within a gear box assembly. The gear box assembly also includes a pair of encoders coupled to the lead screw and splined shaft for monitoring the angular rotation thereof. Cam actuated correcting means are also located within the gear box assembly to compensate for tolerances in the mechanical structure of the plotter.

BACKGROUND OF THE INVENTION

(1) Field of the invention

This invention relates to precision plotters, and more particularly to computer controlled digital drafting systems.

(2) Description of the prior art

In general, plotting systems are used primarily for restructuring computed data via microfilm or pen-on-paper visuals. Such plotting systems usually have pen means driven in two directions (commonly termed the X and Y axes) with respect to the plotter. Heretofore a variety of drive mechanisms have been utilized for driving the pens along the X and Y axes of the plotters.

In one type of plotter the pen is slidable along a fixed bar to provide movement in one direction while a roll of paper is movable transversely with respect to the bar, to provide relative movement along an X and Y axes. Although such processes are used extensively, several shortcomings are inherent that severely limits their utilization. One such shortcoming is that although such a plotter can produce plots up to 120 feet long, the usual length of the roll of paper, its usual plotting width is only 11 inches. Any larger widths would result in the roll of paper becoming unwieldly and inaccurate, thereby making such devices impractical for large scale plots.

Another type of plotter is the flat bed type wherein the paper is stationary and the pen is slidable along a movable arm which is slidably conected at both ends to a pair of transverse bars to provide movement of the pen in two directions. Movement of the pen and the arm is usually accomplished by cable and pulley means. A shortcoming with this type of plotter is the inherent imprecision of the drive means which severely limits the plotter as to its accuracy. Moreover, most of these plotters are also limited as to the size of the working area.

The larger table models usually have adequate working areas, but they also suffer from various shortcomings. In such devices, in order to maintain a close tolerance, the support means and the movable arm are of a large and bulky construction. In some devices the movable arm carries the drive means for the pen, which also adds weight and complexity to the device.

Furthermore, in all of the above-mentioned devices no means are provided to compensate for the buildup of tolerances structured therein. As a result, repeatability of these devices is poor, and precision plotting is practically impossible with such devices.

SUMMARY OF THE INVENTION

This invention obviates the above-mentioned shortcomings by providing a plotting system that is light in weight, simple in construction and extremely accurate in plotting. The plotter includes a movable arm extending transversely across a large table. The base of the arm is connected to an arm carriage which is threadedly engaged to a lead screw rotatably mounted along the one edge of the table. The lead screw functions to drive the carriage and the arm in the X direction. A pen carriage is slidably mounted on the movable arm and is driven along the arm in the Y direction by means of a cable. A drum is rotatably mounted on the arm carriage and is adapted to receive and drive the cable. The drum, in turn, is axially movable along a splined shaft rotatably mounted along the one edge of the table adjacent the lead screw. The lead screw and the splined shaft are rotatably driven by motor means located within a gear box assembly. The gear box assembly also includes a pair of encoders coupled to the ends of the lead screw and the splined shaft for monitoring the angular rotation thereof. Also included within the gear box assembly are cam actuated correcting means connected to the encoders for controlling the angular position thereof to compensate for the tolerances in the mechanical structure of the plotter.

An important advantage of the present invention is that lead screws can be machined to a very high precision. As a result, the errors in the travel of the carriage and the movable arm in the X direction are extremely small. Moreover, since the motor means for driving the pen carriage along the Y axis is not located on the movable arm, the arm can be made much simpler and lighter.

Another important advantage of the plotter is that since the motor means and the monitoring means are located in one assembly, the compensating means can be conveniently located thereby, and can be made of much simpler construction than heretofore possible. Such compensating means enables the device to have extremely accurate plotting capabilites.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
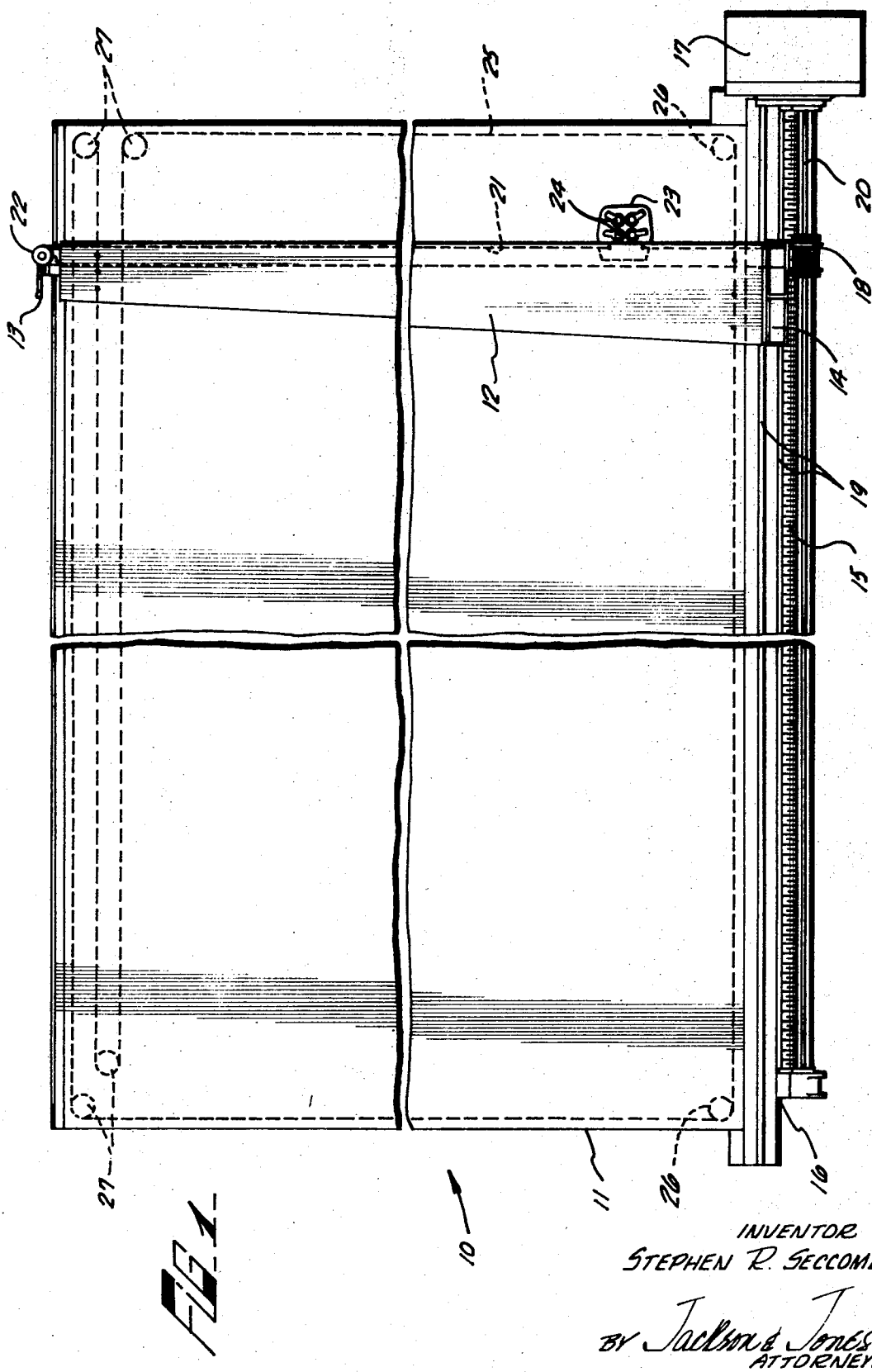
FIG. 1 is a top elevational view of the precision plotter in acocrdance with the present invention.

Referring now to the drawings, FIG. 1 shows a precision plotter, generally indicated by arrow 10, including a large table 11 having a rather large surface area for supporting either conventional drafting size paper or roll size. A movable arm 12 extends transversely across the table 11 and is supported at its upper end by a mount 13 which is adapted to slide along the upper edge of the table 11. The lower end of the arm 12 is fixedly connected to a carriage 14 which is slidably mounted upon a pair of elongated guide bars 19. The carriage 14 is also threadedly engaged to a lead screw 15 to be axially driven thereby in the X direction. The lead screw 15 is rotatably mounted at the lower edge of the table and is connected at one end to a bearing support 16 while the other end is connected to a gear-box assembly 17. A drum 18, rotatably supported on the carriage 14, extends around a splined shaft 20 and is adapted to be axially movable with respect to the shaft 20 and rotatably movable therewith. A closed-loop cable 21 is fixedly attached and wound around the drum 18 by a plurality of winds, with the loop extending along the movable arm 12 to the other end thereof to be supported by a pulley 22 rotatably mounted on the mount 13. A pen carriage 23 is slidably mounted on the movable arm 12 and is adapted to support a plurality of pens 24 in a conventional manner. The pen carriage 23 is attached to the cable 21 to be longitudinally driven along the length of the movable arm 12 in the Y direction.

The carriage 14 and the top end of the movable arm 12 are also connected to a closed-loop cable 25 that extends around the periphery of the table 11 to insure that both ends of the movable arm 12 travel in unison. A plurality of pulleys are located beneath the table 11 at the four corners thereof. Each of the lower two corners has a single pulley 26 mounted thereon while each upper corner has a pair of pulleys 27 mounted thereon. The cable loop 25 extends around the pulleys 26, up the sides of the table and then around the pulleys 27 in an S-shaped configuration. The carriage 14 is fixedly connected to the cable 25 at the base of the table while the upper end of the movable arm 12 is fixedly connected to the middle line of the S-shaped configuration to enable it to travel in the same direction as the carriage 14.

Figure 2:
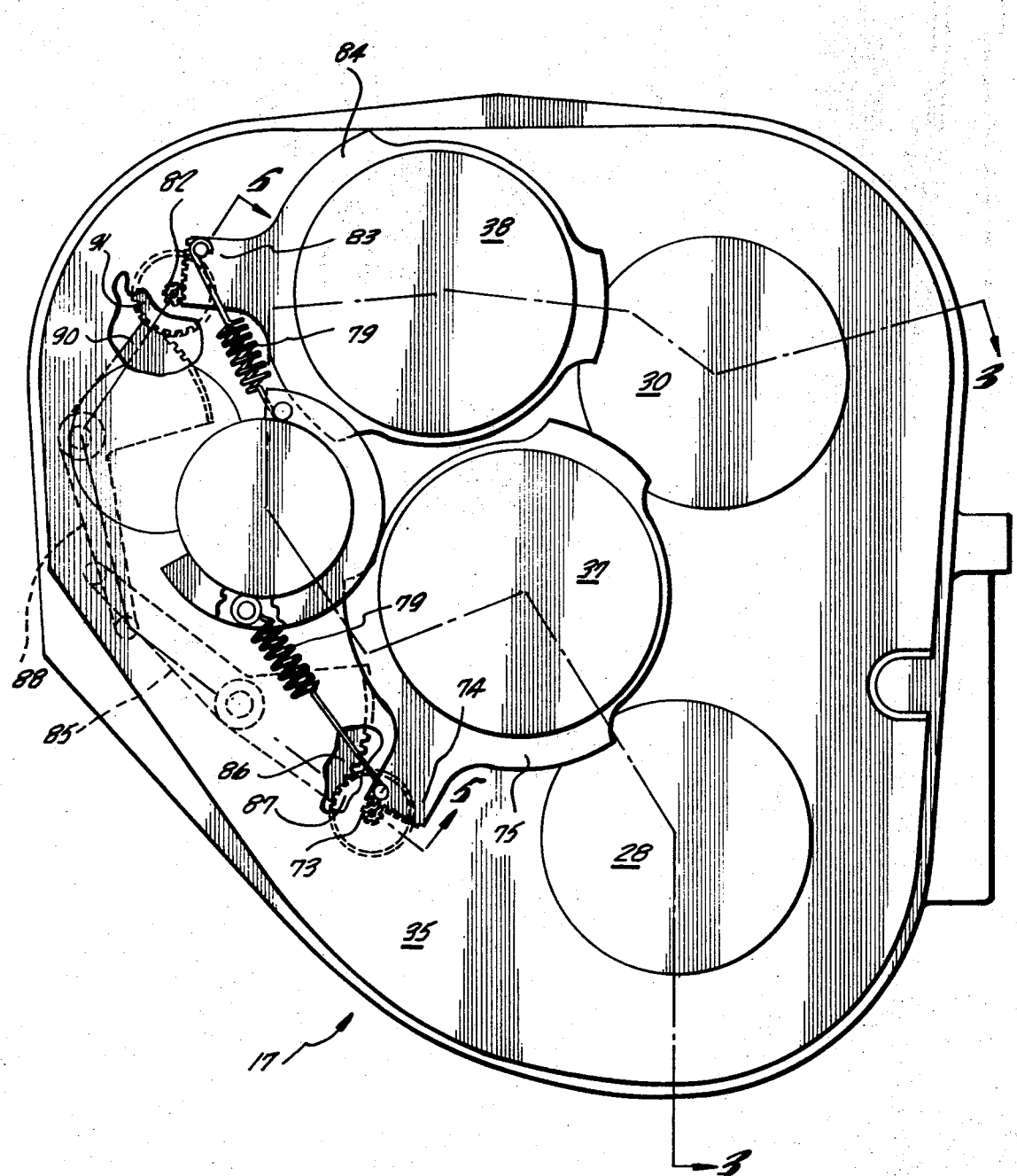
FIG. 2 is a side elevational view of the gear box assembly housing the drive means, the encoder means and the correction means.
Figure 3:
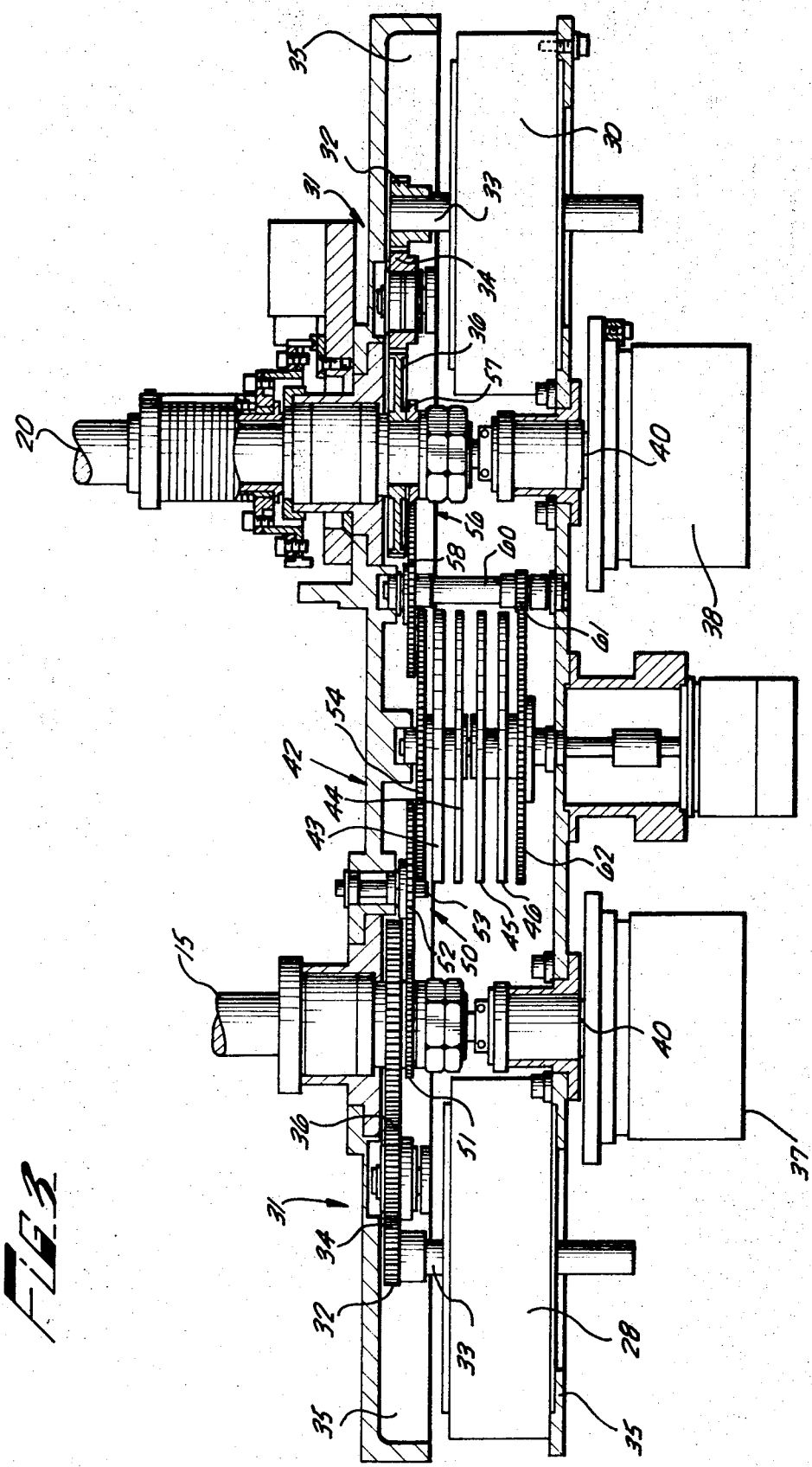
FIG. 3 is a cross-sectional view of the gear box assembly taken along lines 3—3 of FIG. 2.
Figure 4:
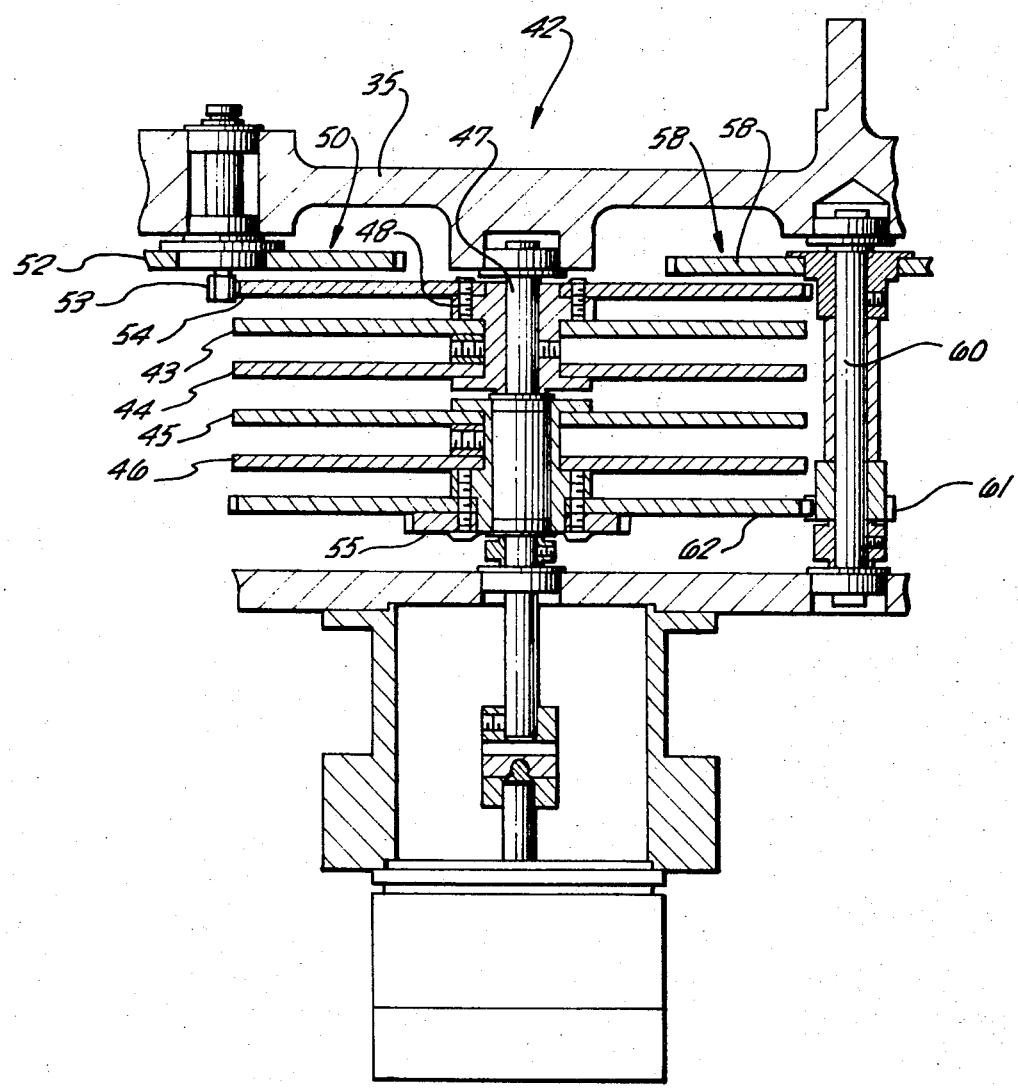
FIG. 4 is an enlarged fragmentary view of the cam actuated correcting means shown in FIG. 3.

Referring now to FIGS. 2–4, the lead screw 15 and the splined shaft 20 are rotatably driven by a pair of motors 28 and 30 which are rotatably connected thereto by means of gear trains, generally indicated by arrow 31. Each gear train 31 includes a pinion gear 32 keyed to the motor shaft 33 which, in turn, engages an idler gear 34 rotatably mounted on the fixed housing 35 of the gear-box assembly 17. Each idler gear 34 engages a driven gear 36 fixedly mounted on the respective lead screw 15 and splined shaft 20. A pair of encoders 37 and 38 is also mounted on the fixed housing 35 of the gear-box assembly 17 and is coupled to the lead screw 15 and the splined shaft 20, respectively. Each encoder includes a shaft 40 extending outwardly therefrom with each shaft 40 being coupled to a respective extension of the lead screw 15 and the splined shaft 20 by means of a flexible bellows (not shown). Such couplings function to permit axial play between the shafts while preventing any relative rotation therebetween. The encoders 37 and 38 may be of various conventional constructions that operate to monitor the angular rotation of the lead screw and the splined shaft. For descriptive purposes in explaining the operation of the plotter hereinafter, the encoders are preferably geared in such a manner that one revolution of the encoder shaft corresponds to one inch of travel of the pen in the respective X and Y directions.

A common type of encoder includes a plurality of etched markings located around the shaft with the number of etched markings conventionally numbering 4,000 for one revolution. An optical read-out or sensing device is positioned within the encoder to record the number of counts or etched markings traversing past it as the shaft rotates. As can be seen, one count on the optical read-out is equivalent to .00025 inch of travel of the pen. The information received by the optical read-out is then fed to a digital computer for monitoring and feed-back purposes.

As more clearly shown in FIG. 4, a cam actuated correcting means, generally indicated by arrow 42, is adapted to compensate for the tolerances, although small, of the mechanical drive system. The four errors encountered in the mechanical drive system, although not necessarily limited to them, are (1) the errors of the pen travel caused by any rotary misalignment of the splinded shaft 20, i.e. the errors in the Y direction as a function of X; (2) the errors caused by the inaccuracies of the machining of the lead screw, i.e. the errors in the X direction as a function of X; (3) the errors caused by any misalignment of the movable arm, i.e. the errors in the X direction as a function of Y; and (4) the errors caused by the inaccuracies of the cable and drum mechanism, i.e. the errors in the Y direction as a function of Y.

It should be noted that these are the main reasons for the inaccuracies in the drive mechanism although all the actual tolerances are taken into account in the actual calibration of the cams.

Referring again to FIG. 4, the correcting means 42 includes a plurality of cams 43, 44, 45 and 46 mounted on a shaft 47 which is rotatably mounted on the fixed housing 35 of the gear-box assembly 17. The cams 43 and 44 are fixedly mounted upon a hub 48 which is keyed to the shaft 47. The hub 48 is also connected to the lead screw 15 by means of a gear train, generally indicated by arrow 50. The gear train 50 includes a pinion gear 51 fixedly mounted on the lead screw 15 and is engaged to an idler gear 52 rotatably mounted on the fixed housing 35 of the gear-box assembly 17. The idler gear 52 is fixed to a smaller drive gear 53 for engagement with a driven gear 54 fixedly mounted on the hub 48. The second pair of cams 45 and 46 is fixedly connected to a second hub 55 which is rotatably mounted on the shaft 47. Similarily, the second hub 55 is connected to the splined shaft 20 by means of a gear train, generally indicated by arrow 56, which includes a pinion gear 57 connected to the splined shaft 20. An idler gear 58 is rotatably mounted on one end of an idler shaft 60 which extends across both sides of the fixed housing 35. A smaller drive gear 61 is mounted on the other end of the idler shaft 60 and engages a driven gear 62 fixedly connected to the second hub 55.

As can be seen, the lead screw 15 functions to rotate cams 43 and 44 while the splined shaft 20 rotates the cams 45 and 46.

Figure 5:
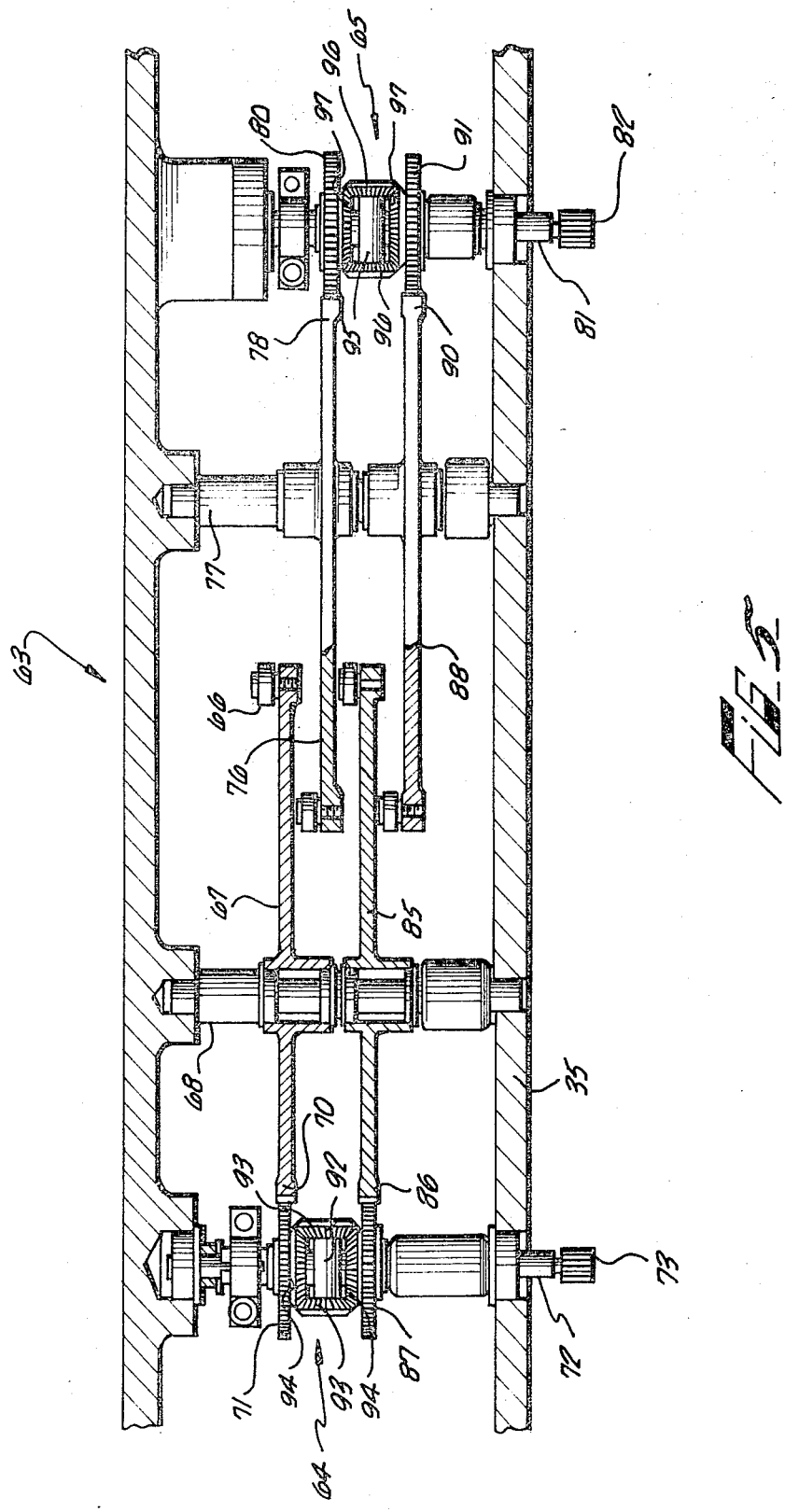
FIG. 5 is a cross-sectional view of the rocker arm assembly taken along lines 4—4 of FIG. 2.

As shown in FIG. 5, the cams 43, 44, 45 and 46 frictionally engage a rocker arm assembly, generally indicated by arrow 63, which functions, through a pair of differential gear assemblies, generally indicated by arrows 64 and 65 to vary the angular position of the encoders 37 and 38. The periphery of the cam 43 is adapted to frictionally engage a roller 66 mounted on one end of a rocker arm 67. The rocker arm 67 is pivotally mounted on a shaft 68 fixedly engaged to the fixed housing 35 of the gear-box assembly 17. The other end of the rocker arm 67 forms a gear sector 70 (see FIG. 2) which engages a gear 71 of the differential gear assembly 64. The gear 71 is rotatably mounted on a shaft 72 journaled in the fixed housing 35 of the gear-box assembly 17 with the other end of the shaft 72 fixedly supporting a pinion gear 73. The pinion gear 73 engages a gear sector 74 of a support plate 75 which pivotally supports the encoder 37 (see FIG. 2). In a like manner, the periphery of the cam 44 is adapted to frictionally engage a rocker arm 76 that is rotatably mounted on a shaft 77. The other side of the rocker arm also forms a gear sector 78 which engages a gear 80 of the differential gear assembly 65. The gear 80 is rotatably mounted on a shaft 81 having a pinion gear 82 fixedly mounted on its end for engaging a gear sector 83 of a support plate 84 which pivotally supports the encoder 38. Each of the gear sectors 74 and 83 is held under tension by a spring 79 connected to the fixed housing 35.

The cam 45 frictionally engages a rocker arm 85 rotatably connected to the shaft 68, with the other end forming a gear sector 86 which engages a gear 87 of the differential gear assembly 64. The gear 87 is also rotatably mounted on the shaft 72. Similarly, the cam 46 is frictionally engaged to a rocker arm 88 rotatably mounted on the shaft 77 with the other end of the rocker arm 88 forming a gear sector 90 for engaging a gear 91 of the differential gear assembly 65, the gear 91 also being rotatably mounted on the shaft 81.

In the differential gear assembly 64 a transverse shaft 92 is integrally connected to the shaft 72 with the transverse shaft 92 having a pair of bevel gears 93 rotatably mounted at its ends. Each of the gears 71 and 87 is also integrally connected to a bevel gear 94 which engages the pair of bevel gears 93.

The structure of the differential gear assembly 65 is identical, with a transverse shaft 95 having a pair of bevel gears 96 engaging a pair of bevel gears 97 integrally connected to the gears 80 and 91.

In operation the lead screw 15 functions to drive the carriage 14 and the movable arm 12 in the X axis direction and is rotatably driven by the drive motor 28 with the angular rotation being monitored by the encoder 37. The splined shaft 20 functions to rotatably drive the drum 18 which controls the travel of the cable 21. The cable 21 is connected to the pen carriage 23 to move the pen carriage 23 in the Y axis direction. The splined shaft 20 is rotatably driven by the motor 30 with the angular position thereof monitored by the encoder 38. The information received by the encoders 37 and 38 is transmitted, as part of a closed-loop system, to a digital computer. The computer receives its commands from the programmed magnetic tape, which, in turn, are given to the drive motors 28 and 30. Upon receiving the commands, the drive motors 28 and 30 rotatably drive the lead screw 15 and splined shaft 20, respectively, with the change in angular position of each being fed back by the encoders 37 and 38 to the computer. Therefore, if it were desired to draw a straight line in the X direction, the lead screw 15 would be rotated to axially drive the carriage 14 and the movable arm 12 in the X axis direction. The splined shaft 20 would remain stationary with the drum 18 axially sliding thereon. Since the drum 18 would not be rotated, the pen carriage would remain stationary with respect to the movable arm and would travel in the X axis direction therewith.

If it were desired to draw a straight line in the Y axis direction, the lead screw 15 would remain stationary and the splined shaft 20 would be rotated to drive the cable 21 and the pen carriage 23 along the movable arm 12.

If it were desired to draw a curve or a straight line at an angle from the X or Y axis, the pen travel would be accomplished incrementally. Naturally if it were desired to carry the pen to a different point to scribe, it would be lifted off the paper by conventional means, until it reached the desired location for scribing.

As stated previously, assuming tolerances, although extremely small, in the threading and machining of the lead screw 15 over its entire length which would create inaccuracies in the pen travel in the X direction, the cam 43 is calibrated to correct this error. The cam 43 is rotatably driven by the lead screw 15 and is geared that one revolution of the cam 43 corresponds to the travel of the carriage 14 over the entire length of the lead screw 15. As stated previously, the lead screw 15 also functions to rotate the shaft 40 of the encoder 37, which records the angular rotation of the lead screw 15 with respect to the optical read out of the encoder 37. In short, the cam 43 functions to rotate the housing and optical read out of the encoder 37 with respect to the lead screw 15 to add or subtract a number of counts to the effective travel of the lead screw 15. For example, if it were desired to move the carriage 14 along the X axis one inch, the computer would command the drive motor 28 to rotate the lead screw 15 until the encoder 37, through the feedback loop, would read out 4,000 counts. However, if it were found that the actual traversal of the pen were 1.0005 inches, the cam 43 would be profiled at the corresponding portion of the cam to pivot the rocker arm 67 which turns the differential gear assembly 64 to rotate the housing of the encoder 37 counter to the direction of rotation of the lead screw 15 a distance from a reference point equal to two counts. Therefore, upon rotation of the lead screw 15 a total of 4,000 counts with respect to the encoder read-out, the counter rotation of the encoder 37 in effect causes the lead screw 15 to have only rotated 3,998 counts; with respect to the initial reference point, which, of course, is the actual rotation of the lead screw 15. Therefore, instead of a travel of 1.0005 inches for 4,000 counts, the travel is reduced two counts, or .0005 inch to the desired one inch.

If it were found that the travel of the pen was only .9995 inch, the cam 43 would be profiled at that portion to rotate, through the rocker arm 67 and differential gear assembly 64, the encoder 37 in the same rotational direction as the lead screw 15 and amount equal to two counts to enable the effective travel of the lead screw 15 to be 4,002 counts, even though only 4,000 counts are read out by the encoder. It should be noted that if no errors were involved at those particular points of travel, the cams would have an arcuate profile at that corresponding portion, known as the zero error line. If the lead screw were completely accurate over its entire length the cam would have a circular profile with its periphery on the zero error line. Therefore, any inaccuracies would cause the profile to be shaped either above or below the zero error line. Similarly, to compensate for the misalignment of the lead screw 15, the cam 44 is shaped to correct the angular position of the housing of the encoder 38 through the interaction of the rocker arm 76 and differential gear assembly 65. The encoder 38 functions to control the rotation of the splined shaft 20 to keep the pen tracking in the proper X axis direction. The errors due to the misalignment of the movable arm 12 and the inaccuracies of the drum 18 and cable 21 drive are similarily compensated for by the cams 45 and 46 which are respectively connected to the rocker arm 63 and the differential gear assemblies 64 and 65 to control the angular position of the encoders 37 and 38.

In combining the errors in the X direction, cams 43 and 45 function to correct the errors due to the improper threading of the lead screw 15 and the bending of the movable arm 12. For example, if it were found that it commanding the drive motor 28 to move the pen 24 one inch in the X direction, the error in the lead screw 15 would move the pen 1.0005 inches while the error in the movable arm 12 at that height would move the pen 24 only .99975 inch; cams 43 and 45 would be profiled in such a manner that cam 43 would tend to pivot the encoder in one direction to effectively lose two counts, while the cam 45 would be profiled in such a manner to advance the angular position of the encoder a distance of one count. Therefore, because of the differential gear assembly 64, the movement of each gear 71 and 87 caused by the cams 43 and 45 are algebraically summed to move the transverse shaft 92 a direction whereby the encoder 37 is rotated only one count in the positive direction to effectively add one count of the angular rotation of the lead screw 15. Cams 44 and 46 likewise function in a similar manner to algebraically sum the errors in the Y direction to determine the proper angular position of the encoder 38. As a result, all of the errors in the pen drive are compensated by the cam actuated correction means 42.

An important advantage of this plotter is that the computer programming is not affected by the tolerances of each individual plotter since they are compensated for mechanically. As a result, the same programs can be utilized on every plotter of this type.

Therefore, in accordance with the present invention, the drive system for the precision plotter is comparatively simpler, relatively lighter, and inherently more accurate than any plotter heretofore manufactured.

What is claimed is:

1. In a positioning device for producing a translation of an element along two axes in a plane comprising:
   means for driving the element along a first axis;
   means for driving the element along a second axis; and
   first means for compensating for the errors in the first axial direction as a function of both the first and second axis drive means.

2. The invention of claim 1 further comprising second means for compensating for the errors in the second axial direction as a function of both the first and second axis drive means.

3. The invention of claim 1 wherein said first means comprises a first pair of cams, one cam being profiled with a contour representing the difference of the true position of the element along the first axial direction from the theoretically true position thereof with respect to the first axis drive means, the other cam being profiled with a contour representing the difference of the true position of the element along the first axial direction from the theoretically true position thereof with respect to the second axis drive means.

4. The invention of claim 2 wherein said second means comprises a second pair of cams, one cam being profiled with a contour representing the difference of the true position of the element along the second axial direction from the theoretically true position thereof with respect to the first axis drive means, the other cam being profiled with a contour representing the difference of the true position of the element along the second axial direction from the theoretically true position thereof with respect to the second axis drive means.

5. The invention of claim 3 further comprising a first differential coupling means interconnecting said first pair of cams for summing the displacement of the interconnected cams.

6. The invention of claim 4 further comprising a second differential coupling means interconnecting the second pair of cams for summing the displacement of the interconnected cams.

7. The invention of claim 5 wherein said first axis drive means are rotatably driven with means provided for translating said rotary motion to planar motion.

8. The invention of claim 6 wherein said second axis drive means are rotatably driven with means provided for translating said rotary motion to planar motion.

9. The invention of claim 7 wherein said first means further comprises first sensing means coupled to said first axis drive means for indicating the angular position thereof.

10. The invention of claim 8 wherein said second means further comprises second sensing means coupled to said second axis drive means for indicating the angular position thereof.

11. The invention of claim 9 wherein said first differential coupling means is coupled to said first sensing means, with the sensing means deriving its position therefrom for applying a variable adjustment to said sensing means for correcting the displacement of said first axis drive means.

12. The invention of claim 10 wherein said second differential coupling means is coupled to said second sensing means, with the sensing means deriving its position therefrom for applying a variable adjustment to said sensing means for correcting the displacement of said second axis drive means.

13. The invention of claim 1 wherein said first axis drive means comprises:
   a movable arm, movable in the first direction; and
   a lead screw rotatably mounted and coupled to said movable arm for driving said arm in the first axial direction.

14. The invention of claim 13 wherein said movable arm extends longitudinally in the second axial direction and said second axis drive means comprises:
   a carriage mounted on said movable arm;
   a splined shaft rotatably mounted at the one end of said movable arm;
   a drum mounted on said splined shaft and axially movable therewith; and
   cable means coupling said drum to said carriage for moving said carriage along the second axial direction upon rotation of said splined shaft and drum.

15. The invention of claim 14 wherein said element is a scribe mounted on said carriage.

16. The invention of claim 9 wherein said first sensing means comprises an optical encoder.

17. The invention of claim 10 wherein said second sensing means comprises an optical encoder.

18. The invention of claim 5 wherein said first coupling means comprises a first differential gear assembly.

19. The invention of claim 6 wherein said second coupling means comprises a second differential gear assembly.

20. The invention of claim 18 wherein said first differential gear assembly is coupled to said respective cams by means of rocker arms, one end of each adapted to slide over the contour of the respective cam and the other end thereof having an arcuate gear sector engaging with a gear of the differential gear assembly.

21. The invention of claim 19 wherein said second differential gear assembly is coupled to said respective cams by means of rocker arms, one end of each adapted to slide over the contour of the respective cam and the other end thereof having an arcuate gear sector engaging with a gear of the differential gear assembly.

22. In a positioning device for producing a translation of an element along two axes in a plane comprising:
   means for driving the element along a first axis;
   means for driving the element along a second axis;
   first means for compensating for the errors in the first axial direction as a function of both the first and second axis drive means;
   second means for compensating for the errors in the second axial directions as a function of both the first and second axis drive means; and
   means for differentially summing the errors in each axial direction.

23. The invention of claim 22 wherein said first means comprises a first pair of cams, one cam being profiled with a contour representing the difference of the true position of the element along the first axial direction from the theoretically true position thereof with respect to the first axis drive means, the other cam being profiled with a contour representing the difference of the true position of the element along the first axial direction from the theoretically true position thereof with respect to the second axis drive means.

24. The invention of claim 22 wherein said second means comprises a second pair of cams, one cam being profiled with a contour representing the difference of the true position of the element along the second axial direction from the theoretically true position thereof with respect to the first axis drive means, the other cam being profiled with a contour representing the difference of the true position of the element along the second axial direction from the theoretically true position thereof with respect to the second axis drive means.

25. The invention of claim 23 wherein said summing means comprises a first differential coupling means for interconnecting said first pair of cams for summing the displacement of the interconnected cams.

26. The invention of claim 24 wherein said summing means comprises a second differential coupling means for interconnecting said second pair of cams for summing the displacement of those interconnected cams.

References Cited

UNITED STATES PATENTS

| | | | |
|---|---|---|---|
| 2,448,473 | 8/1948 | Shrewsbury | 33—125X |
| 2,944,866 | 7/1960 | Moseley | 346—139(B) |
| 2,995,826 | 8/1961 | Brault | 33—125(T) |
| 3,293,651 | 12/1966 | Gerber et al. | 346—(XY) |

FOREIGN PATENTS

| | | | |
|---|---|---|---|
| 844,366 | 7/1952 | Germany | 33—1(M) |
| 3,817 | 1890 | Great Britain | 33—18(A) |

HARRY N. HAROIAN, Primary Examiner

U.S. Cl. X.R.

33—18, 189